(12) United States Patent
Ishida et al.

(10) Patent No.: US 9,172,317 B2
(45) Date of Patent: Oct. 27, 2015

(54) APPARATUS FOR CONTROLLING A MULTI-WINDING ROTARY MACHINE

(71) Applicant: DENSO CORPORATION, Kariya, Aichi-pref. (JP)

(72) Inventors: Jun Ishida, Kariya (JP); Tomoya Takahashi, Kasugai (JP)

(73) Assignee: DENSO CORPORATION, Kariya (JP)

( * ) Notice: Subject to any disclaimer, the term of this patent is extended or adjusted under 35 U.S.C. 154(b) by 21 days.

(21) Appl. No.: 14/156,867

(22) Filed: Jan. 16, 2014

(65) Prior Publication Data

US 2014/0312809 A1    Oct. 23, 2014

(30) Foreign Application Priority Data

Jan. 17, 2013  (JP) ................ 2013-006127

(51) Int. Cl.
*H02P 1/00* (2006.01)
*H02P 6/00* (2006.01)
(Continued)

(52) U.S. Cl.
CPC ............... *H02P 6/002* (2013.01); *H02P 25/22* (2013.01); *H02P 27/08* (2013.01)

(58) Field of Classification Search
CPC . H02P 29/0044; H02P 29/0066; H02P 29/02; H02P 21/0035; H02P 21/0089; H02P 21/04; H02P 2207/03; H02P 23/03; H02P 27/08; H02P 5/753; H02P 6/08; B60K 6/46; H02K 16/02; H02K 21/16; H02M 7/5387
USPC ................ 318/139, 400.04, 730, 798; 701/22
See application file for complete search history.

(56) References Cited

U.S. PATENT DOCUMENTS 5,264,773 A * 11/1993 Koyama et al. ................ 318/798
6,107,774 A     8/2000 Yamada et al.
(Continued)

FOREIGN PATENT DOCUMENTS

JP    03-253293    11/1991
JP    06-294369    10/1994
(Continued)

OTHER PUBLICATIONS

Satake et al., "Decoupling Control of Double-winding Permanent Magnet Synchronous Motor"; JIASC05-1-42; Congress of Industrial Application Group of Institute of Electrical Engineering; Aug. 2005, pp. 1-199-1-202 (4 pages) with partial English translation (2 pages).
(Continued)

*Primary Examiner* — Paul Ip
(74) *Attorney, Agent, or Firm* — Nixon & Vanderhye P.C.

(57) ABSTRACT

An apparatus for controlling a multi-winding rotary machine including an armature formed of a plurality of winding sets. In the apparatus, a command voltage calculator calculates command voltages to be applied to each winding set so as to control currents detected by a current detector to their respectively corresponding command currents. An interfering voltage calculator calculates, for each of the winding sets, interfering voltages proportional to the rotation speed of the rotary machine. An interfering voltage compensator compensates, for each of the winding sets, the command voltages for their respectively corresponding interfering voltages. An operation unit operates a voltage applicator to apply output values of the interfering voltage compensator to each winding set.

7 Claims, 9 Drawing Sheets

(51) Int. Cl.
  *H02P 25/22*  (2006.01)
  *H02P 27/08*  (2006.01)

(56) References Cited

U.S. PATENT DOCUMENTS

| | | | |
|---|---|---|---|
| 8,242,722 B2* | 8/2012 | Matsui et al. | 318/400.04 |
| 2003/0085683 A1 | 5/2003 | Satake et al. | |
| 2007/0035269 A1 | 2/2007 | Tobari et al. | |
| 2008/0018291 A1* | 1/2008 | Atarashi et al. | 318/730 |
| 2010/0109586 A1* | 5/2010 | Matsui et al. | 318/400.04 |
| 2011/0029179 A1* | 2/2011 | Miyazaki et al. | 701/22 |

FOREIGN PATENT DOCUMENTS

| | | |
|---|---|---|
| JP | 11-262293 | 9/1999 |
| JP | 2002-272184 | 9/2002 |
| JP | 2003-153585 | 5/2003 |
| JP | 2007-049843 | 2/2007 |
| JP | 2011-072145 | 4/2011 |

OTHER PUBLICATIONS

Office Action (2 pages) dated Dec. 2, 2014, issued in corresponding Japanese Application No. 2013-006127 and English translation (3 pages).

* cited by examiner

APPARATUS FOR CONTROLLING A MULTI-WINDING ROTARY MACHINE

CROSS-REFERENCE TO RELATED APPLICATION

This application is based on and claims the benefit of priority from earlier Japanese Patent Application No. 2013-6127 filed Jan. 17, 2013, the description of which is incorporated herein by reference.

BACKGROUND

1. Technical Field

The present invention relates to an apparatus for controlling a multi-winding rotary machine including an armature formed of a plurality of winding sets.

2. Related Art

In a three-phase double winding rotary machine, which is a rotary machine having two sets of three-phase windings, an interfering voltage proportional to a derivative of a current flowing through one of the two three-phase winding sets is induced in the other one due to magnetic coupling between the two three-phase winding sets, which may reduce responsiveness of a current control system for an electrical motor. To overcome this drawback, there has been proposed in Japanese Patent Application Laid-Open Publication No. 2003-153585 an apparatus for controlling such a three-phase double winding rotary machine, which is configured to control inverters electrically connected to the respective three-phase winding sets to thereby control the rotary machine. More specifically, command voltages to be applied to the respective three-phase winding sets are corrected by using the interfering voltages proportional to derivatives of currents flowing through the respective three-phase winding sets. Such a technique can prevent reduction of responsiveness of the current control system, thereby reducing ripple components of the currents flowing through the respective three-phase winding sets. This can reduce torque ripple of the electrical motor.

The interfering voltage induced in each three-phase winding set due to magnetic coupling between the two three-phase winding sets includes not only the set forth interfering voltage proportional to the derivative of the current, but also an interfering voltage proportional to a rotation speed of the electrical motor. When the rotation speed of the electrical motor is high or varies with time, the interfering voltage proportional to the rotation speed of the electrical motor may reduce responsiveness of the current control system, which may lead to an increase in torque error, where the torque error is a deviation of an output torque of the electrical motor from its command torque.

In consideration of the foregoing, it would therefore be desirable to have an apparatus for controlling a multi-winding rotary machine, capable of properly increasing responsiveness of the current control system for the multi-winding rotary machine.

SUMMARY

In accordance with an exemplary embodiment of the present invention, there is provided an apparatus for controlling a multi-winding rotary machine having an armature formed of a plurality of winding sets, which apparatus is incorporated in a rotary machine control system having a current detector configured to, for each of the winding sets, detect currents flowing through the winding set, and a voltage applicator configured to, for each of the winding sets, apply voltages to the winding set. The apparatus includes: a command voltage calculator configured to, for each of the winding sets, calculate command voltages to be applied to the winding set so as to control the currents detected by the current detector to their respectively corresponding command currents; an interfering voltage calculator configured to, for each of the winding sets, calculate interfering voltages proportional to a rotation speed of the rotary machine, the interfering voltages being caused by magnetic coupling between the winding set and at least one of the other winding sets; an interfering voltage compensator configured to, for each of the winding sets, compensate the command voltages calculated by the command voltage calculator for their respectively corresponding interfering voltages calculated by the interfering voltage calculator; and an operation unit configured to, for each of the winding sets, operate the voltage applicator to apply output values of the interfering voltage compensator to the winding set.

With this configuration, for each of the winding sets, command voltages to be applied to the winding set can be compensated for their respectively corresponding interfering voltages proportional to the rotation speed of the rotary machine, which can preferably improve the responsiveness of the current control system for the rotary machine. Accordingly, a torque error of the rotary machine can be reduced even when the rotation speed of the rotary machine is high and/or varies with time.

DESCRIPTION OF SPECIFIC EMBODIMENTS (First Embodiment)

There will now be explained a control apparatus for controlling a multi-winding rotary machine with reference to the accompanying drawings, where the control apparatus is mounted in a vehicle including an engine as a vehicle prime mover.

Figure 1:
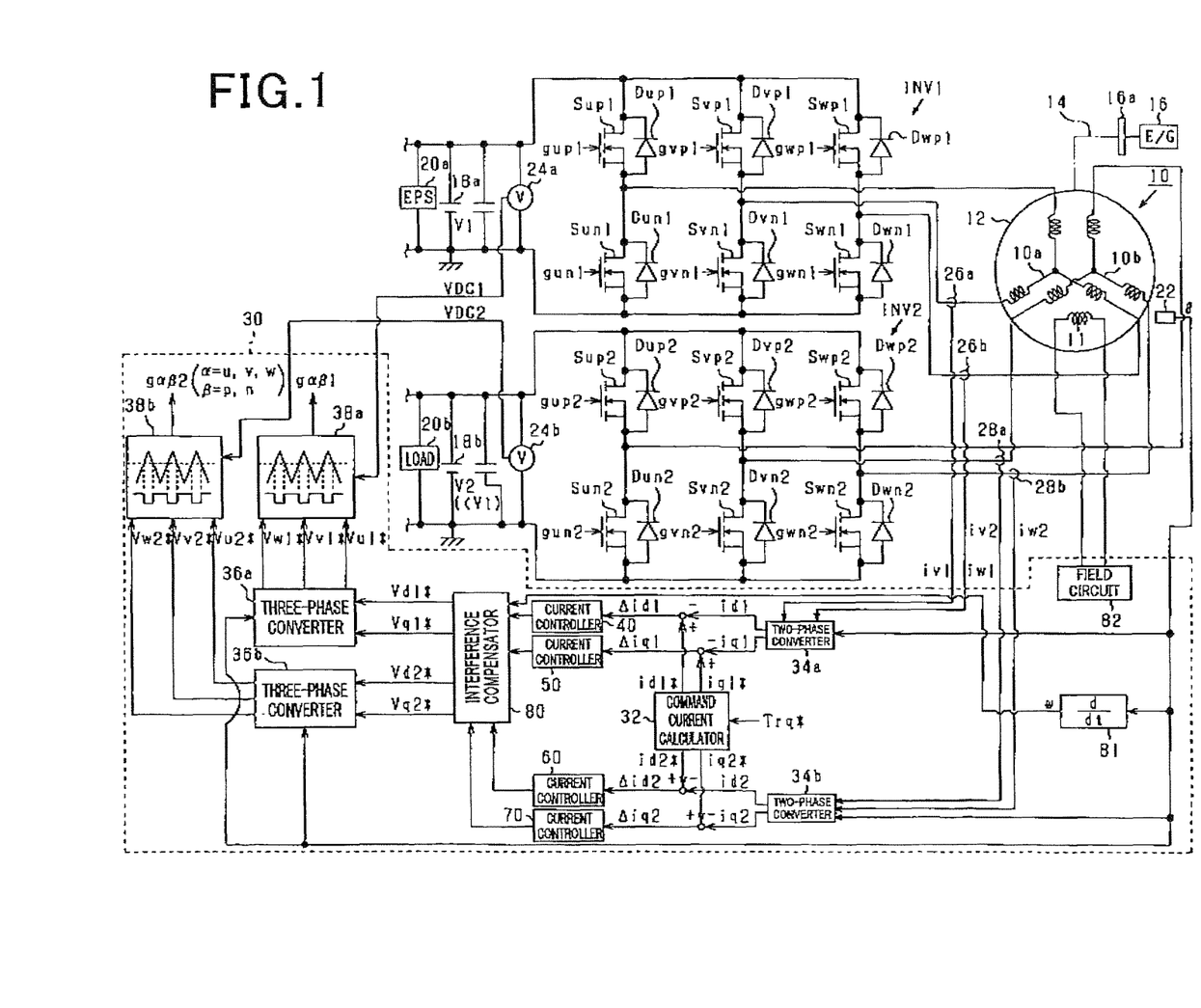
FIG. 1 schematically shows a rotary machine control system in accordance with a first embodiment of the present invention.

As shown in FIG. 1, a motor 10 is a three-phase double winding rotary machine, more specifically, a wound-field synchronous electrical motor. In the present embodiment, the motor 10 may be an integrated starter generator (ISG) that functions both as a starter and an alternator. A rotor 12 of the motor 10 includes field windings 11. Power transmission is enabled between the rotor 12 and a crankshaft 16a of an engine 16. In the present embodiment, the rotor 12 is connected to a crankshaft 16a via a belt 14.

A stator of the motor 10 includes two sets of three-phase windings: a first winding set 10a and a second winding set 10b. The first and second winding sets 10a, 10b have respectively different neutral points.

Two inverters, one of which is associated with the first winding set 10a and the other of which is associated with the second winding set 10b, are electrically connected to the motor 10. More specifically, the inverter INV1 is electrically connected to the first winding set 10a, and the second inverter INV2 is electrically connected to the second winding set 10b. The inverter INV1 is electrically connected to a first battery 18a as a DC power supply, such as a lithium-ion battery or a nickel-hydrogen storage cell or the like, and the second inverter INV2 is electrically connected to a second battery 18b as a DC power supply, such as a lead battery or the like. In the present embodiment, the inverter INV1 and the inverter INV2 form a voltage applicator.

In the present embodiment, it is assumed that the second battery 18b is used as an accessory battery. Hence, a terminal voltage V1 of the first battery 18a is higher than a terminal voltage V2 of the second battery 18b. More precisely, an open circuit voltage of the first battery 18a is higher than that of the second battery 18b when the first and second batteries 18a, 18b are in the same state of charge (SOC). In the present embodiment, it is assumed that the terminal voltage V1 of the first battery 18a is of the order of four times higher than the terminal voltage V2 of the second battery 18b. For example, the terminal voltage of the first battery 18a is of the order of 48 volts, and the terminal voltage of the second battery 18b is of the order of 12 volts.

To this end, in the present embodiment, a turn number N1 of each winding of the first winding set 10a is set greater than a turn number N2 of each winding of the second winding set 10b. More specifically, in the present embodiment, the turn number N1 is set of the order of four times greater than the turn number N2.

The first inverter Inv1 includes three series connections of switching elements: a first series connection of high-side and low-side switching elements Sup1, Sun1, a second series connection of high-side and low-side switching elements Svp1, Svn1, and a third series connection of high-side and low-side switching elements Swp1, Swn1. A junction of the first series connection of high-side and low-side switching elements Sup1, Sun1 is electrically connected to a U-phase terminal of the first winding set 10a, a junction of the second series connection of high-side and low-side switching elements Svp1, Svn1 is electrically connected to a V-phase terminal of the first winding set 10a, and a junction of the third series connection of high-side and low-side switching elements Swp1, Swn1 is electrically connected to a W-phase terminal of the first winding set 10a. In the present embodiment, each of the switching elements $S\alpha\beta1$ ($\alpha=u, v, w, \beta=p, n$) is an N-channel MOSFET and is electrically connected in anti-parallel with a respectively corresponding freewheel diode $D\alpha\beta$ ($\alpha=u, v, w, \beta=p, n$). Each freewheel diode $D\alpha\beta1$ ($\alpha=u, v, w, \beta=p, n$) may be a body diode of a corresponding switching element $s\alpha\beta1$.

As with the first inverter Inv1, the second inverter INV2 includes three series connections of switching elements: a first series connection of high-side and low-side switching elements Sup2, Sun2, a second series connection of high-side and low-side switching elements Svp2, Svn2, and a third series connection of high-side and low-side switching elements Swp2, Swn2. A junction of the first series connection of the high-side and low-side switching elements Sup2, Sun2 is electrically connected to a U-phase terminal of the second winding set 10b, a junction of the second series connection of the high-side and low-side switching elements Svp2, Svn2 is electrically connected to a V-phase terminal of the second winding set 10b, and a junction of the third series connection of the high-side and low-side switching elements Swp2, Swn2 is electrically connected to a W-phase terminal of the second winding set 10b. In the present embodiment, each of the switching elements $S\alpha\beta2$ ($\alpha=u, v, w, \beta=p, n$) is an N-channel MOSFET and is electrically connected in anti-parallel with a respectively corresponding freewheel diode $D\alpha\beta2$ ($\alpha=u, v, w, \beta=p, n$). Each freewheel diode $D\alpha\beta2$ ($\alpha=u, v, w, \beta=p, n$) may be a body diode of a corresponding switching element $S\alpha\beta2$.

An electrical power steering (EPS) device 20a, as a vehicle-mounted device, is electrically connected to terminals of the first inverter Inv1 on its first-battery 18a side to assist the steering action. In the present embodiment, the electrical power steering device 20a is powered by at least one of the motor 10, as an alternator, and the first battery 18a. An electrical load 20b, such as a control circuit of a vehicle-mounted device, a navigation device, an audio device or the like, as a vehicle-mounted device, is electrically connected to terminals of the second inverter Inv2 on its second-battery 18b side. In the present embodiment, the electrical load 20b is powered by at least one of the motor 10 and the second battery 18b.

Since it is assumed that a demand voltage of the electrical power steering device 20a is set higher than a demand voltage of the electrical load 20b, the electrical power steering device 20a is electrically connected to the first battery 18a.

A rotary machine control system of the present embodiment includes, as detectors to detect states of the motor 10 and the first and second inverters INV1, INV2, a rotation angle sensor 22 configured to detect a rotation angle (an electric angle θ) of the motor 10, a first voltage sensor 24a configured to detect an input voltage of the first inverter INV1 (a first power-supply voltage VDC1), a second voltage sensor 24b configured to detect an input voltage of the second inverter INV2 (a second power-supply voltage VDC2), first current sensors 26a, 26b configured to detect V-phase and W-phase currents of the first winding set 10a, respectively (currents flowing through the first winding set 10a in a stationary coordinate system), and second current sensors 28a, 28b configured to detect V-phase and W-phase currents of the second winding set 10b, respectively (currents flowing through the second winding set 10b in a stationary coordinate system). Each of the first current sensors 26a, 26b and the second current sensors 28a, 28b may include, for example, a current transformer or a resistor.

Detection values of the above various sensors are fed to a controller 30. The controller 30 includes a central processing unit (CPU) and a memory storing computer programs to be executed in the CPU to perform various control processes described later. The controller 30 generates and transmits operation signals to operate the first inverter INV1 and the second inverter INV2 on the basis of the detection values of the above sensors so as to control a controlled variable (i.e., an output torque) of the motor 10 to a command value (i.e., a command torque Trq*). More specifically, the controller 30 operates the switching elements $S\alpha\beta 1$, $S\alpha\beta 2$ ($\alpha$=u, v, w, $\beta$=p, n) so that currents flowing through the first and second winding sets 10a, 10b coincide with command currents to achieve a command torque Trq*. That is, in the present embodiment, the controller 30 controls the currents flowing through the first and second winding sets 10a, 10b to their respectively corresponding command currents to thereby control the output torque of the motor 10 to the command torque. Particularly, in the present embodiment, vector control for the first winding set 10a and vector control for the second winding set 10b are performed independently of each other in such current control. In FIG. 1, the operation signals for operating the switching elements $S\alpha\beta 1$ are denoted by $g\alpha\beta 1$ and the operation signals for operating the switching elements $S\alpha\beta 2$ are denoted by $g\alpha\beta 2$.

Subsequently, the above vector control will be explained in more detail. Explanation about a process related to the first winding set 10a is followed by explanation about a process related to the second winding set 10b.

The process related to the first winding set 10a is performed in the following manner.

A command current calculator 32 calculates a d-axis command current and a q-axis command current in a rotating coordinate system for each of the first and second winding sets 10a, 10b on the basis of the command torque Trq*. In the present embodiment, the d-axis command current and the q-axis command current for the first winding set 10a are respectively referred to as a first d-axis command current id1* and a first q-axis command current iq1*. The d-axis command current and the q-axis command current for the second winding set 10b are respectively referred to as a second d-axis command current id2* and a second q-axis command current iq2*. The command current calculator 32 may receive the command torque Trq*, for example, from an upper-level controller that is different from the controller 30 and governs the whole vehicle control.

A first two-phase converter 34a converts the U-, V-, and W-phase currents for the first winding set 10a to a first d-axis current id1 and a first q-axis current iq1 in the rotating coordinate system on the basis of an electric angle $\theta$ detected by the rotation angle sensor 22 and the V-phase current iv1 and the W-phase current iw1 respectively detected by the first current sensors 26a, 26b. The U-phase current for the first winding set 10a is derived from the V-phase and W-phase currents respectively detected by the first current sensors 26a, 26b according to the Kirchhoff's laws.

As above, in the present embodiment, since the first current sensors 26a, 26b and the first two-phase converter 34a are configured to cooperatively detect a current flowing through the first winding set 10a in the rotating coordinate system, the first current sensors 26a, 26b and the first two-phase converter 34a provides a current detector for the first winding set 10a.

A first d-axis current controller 40 calculates a first d-axis command voltage as a manipulated variable to feedback control the first d-axis current id1 to the first d-axis command current id1* from the command current calculator 32. More specifically, the first d-axis current controller 40 conducts proportional-integral control (or proportional-integral-derivative control) on the basis of a deviation $\Delta$id1 of the first d-axis current id1 from the first d-axis command current id1* to calculate the first d-axis command voltage. In addition, a first q-axis current controller 50 calculates a first q-axis command voltage as a manipulated variable to feedback control the first q-axis current iq1 to a first q-axis command current iq1*. More specifically, the first q-axis current controller 50 conducts proportional-integral control (or proportional-integral-derivative control) on the basis of a deviation $\Delta$iq1 of the first q-axis current iq1 from the first q-axis command current iq1* to calculate the first q-axis command voltage.

Output values of the first d-axis current controller 40 and the first q-axis current controller 50 are fed to a first three-phase converter 36a via an interference compensator 80. The interference compensator 80, as described later in more detail, receives an electrical angular speed $\omega$ (a derivative of the electric angle $\theta$) from a rotation speed calculator 81.

The first three-phase converter 36a converts a first d-axis command voltage Vd1* and a first q-axis command voltage Vq1* outputted from the interference compensator 80 into three-phase command voltages V$\alpha$1* ($\alpha$=u, v, w) in the stationary coordinate system of the motor 10 on the basis of the electric angle $\theta$. These command voltages V$\alpha$1* are regarded as manipulated variables to feedback control the first d- and q-axis currents id1, iq1 to the first d- and q-axis command currents id1*, iq1*, respectively.

A first operation unit 38a generates the operation signals g$\alpha\beta$1 to simulate the command voltages V$\alpha$1* ($\alpha$=u, v, w) as three-phase output voltages of the first inverter INV1. In the present embodiment, to generate the operation signals g$\alpha\beta$1, the first operation unit 38a conducts pulse-width modulation (PWM) process on the basis of comparison of whether the command voltages V$\alpha$1* ($\alpha$=u, v, w) normalized by a first power-supply voltage VDC1 detected by the first voltage sensor 24a are above or below a carrier, such as a triangular waveform signal. The first operation unit 38a transmits the operation signals g$\alpha\beta$1 to the first inverter INV1 via an interface (not shown). This allows sinusoid voltages that are 120 degrees out of phase to be respectively applied to the U-, V-, and W-phase windings of the first winding set 10a, which leads to sinusoidal currents that are 120 degrees out of phase respectively flowing through the U-, V-, and W-phase windings of the first winding set 10a.

The process related to the second winding set 10b is performed in a similar manner as follows.

A second two-phase converter 34b converts the U-, V-, and W-phase currents for the second winding set 10b to a second d-axis current id2 and a second q-axis current iq2 in the rotating coordinate system on the basis of the electric angle $\theta$ detected by the rotation angle sensor 22 and the V-phase current iv2 and the W-phase current iw2 respectively detected by the second current sensors 28a, 28b. In the present embodiment, since the second current sensors 28a, 28b and the second two-phase converter 34b are configured to cooperatively detect a current flowing through the second winding set 10b in the rotating coordinate system, the second current sensors 28a, 28b and the second two-phase converter 34b provides a current detector for the second winding set 10b.

A second d-axis current controller 60 calculates a second d-axis command voltage as a manipulated variable to feedback control the second d-axis current id2 to the second d-axis command current id2* from the command current calculator 32. More specifically, as with the first d-axis current controller 40, the second d-axis current controller 60 conducts proportional-integral control (or proportional-integral-derivative control) on the basis of a deviation $\Delta$id2 of the second d-axis current id2 from the second d-axis command current id2* to calculate the second d-axis command voltage. In addition, a second q-axis current controller 70 calculates a second q-axis command voltage as a manipulated variable to feedback control the second q-axis current iq2 to the second q-axis command current iq2* from the command current calculator 32.

More specifically, as with the first q-axis current controller 50, the second q-axis current controller 70 conducts proportional-integral control (or proportional-integral-derivative control) on the basis of a deviation Δiq2 of the second q-axis current iq2 from the second q-axis command current iq2* to calculate the second q-axis command voltage.

Output values of the second d-axis current controller 60 and the second q-axis current controller 70 are fed to a second three-phase converter 36b via the interference compensator 80.

The second three-phase converter 36b converts a second d-axis command voltage Vd2* and a second q-axis command voltage Vq2* outputted from the interference compensator 80 into three-phase command voltages Vα2* (α=u, v, w) in the stationary coordinate system of the motor 10 on the basis of the electric angle θ. These command voltages Vα2* are regarded as manipulated variables to feedback control the second d- and q-axis currents id2, iq2 to the second d- and q-axis command currents id2*, iq2*, respectively.

A second operation unit 38b generates the operation signals gαβ2 to simulate the command voltages Vα1* (α=u, v, w) as three-phase output voltages of the second inverter INV2. In the present embodiment, to generate the operation signals gαβ2, the second operation unit 38b conducts pulse-width modulation (PWM) process on the basis of comparison of whether the command voltages Vα2* (α=u, v, w) normalized by a second power-supply voltage VDC2 detected by the second voltage sensor 24b are above or below a carrier, such as a triangular waveform signal. The second operation unit 38b transmits the operation signals gαβ2 to the second inverter INV2 via an interface (not shown). This allows sinusoid voltages that are 120 degrees out of phase to be respectively applied to the U-, V-, and W-phase windings of the second winding set 10b, which leads to sinusoidal currents that are 120 degrees out of phase respectively flowing through the U-, V-, and W-phase windings of the second winding set 10b.

A field current flowing through the field winding 11 is controlled by a field circuit 82 included in the controller 30. The first operation unit 38a and the second operation unit 38b form an operation unit configured to, for each of the first and second winding sets, operate the inverters INV1, INV2 to apply output values of the interference compensator 80 to the winding set.

Figure 2:
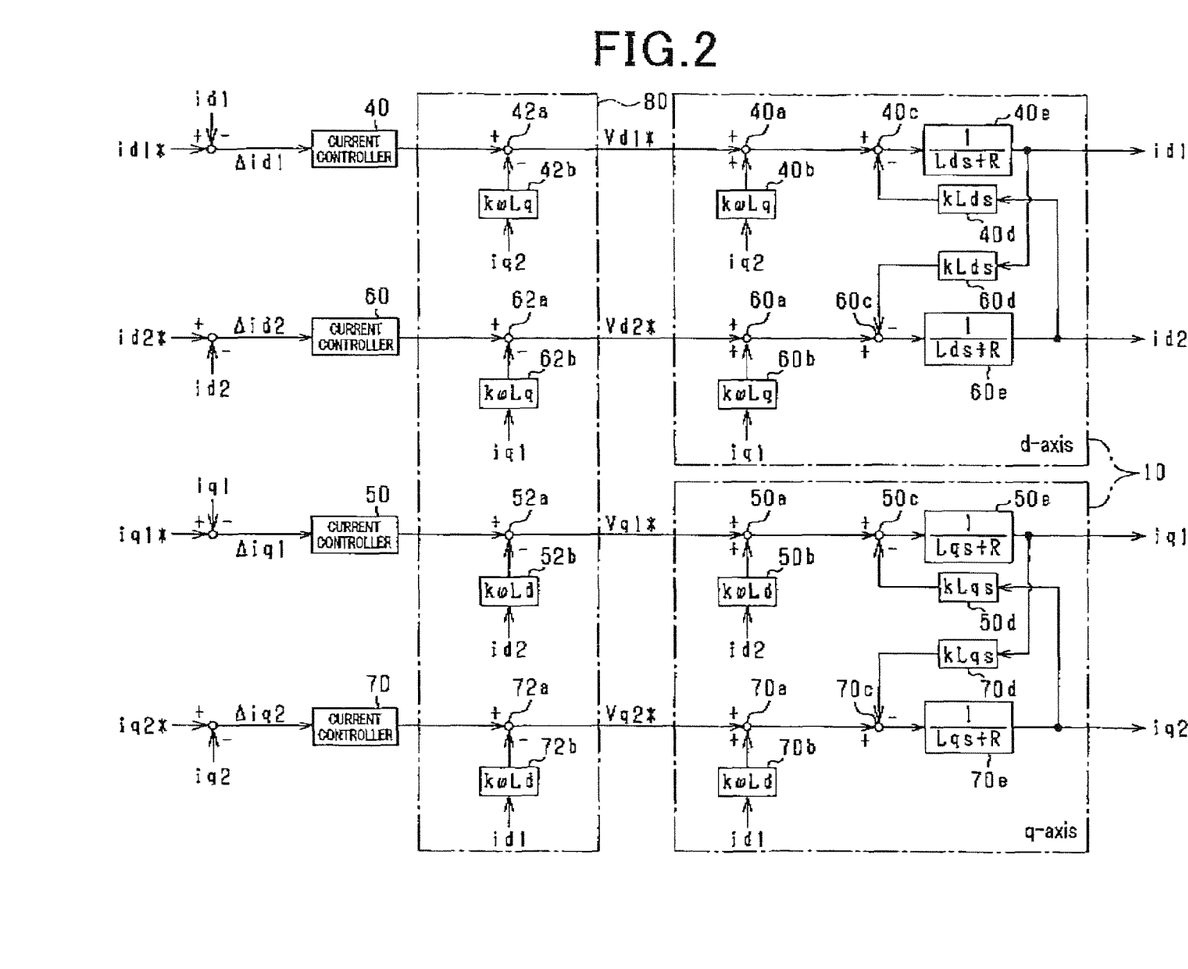
FIG. 2 shows a schematic block diagram of a current control system in accordance with the first embodiment.

A current control system for the motor 10 will now be explained with reference to FIG. 2. FIG. 2 shows a schematic block diagram of the current control system based on the following voltage equation Eq. 1 for first and second winding sets 10a, 10b.

$$\begin{bmatrix} Vd1* \\ Vq1* \\ Vd2* \\ Vq2* \end{bmatrix} = \begin{bmatrix} R+Lds & -\omega Lq & kLds & -k\omega Lq \\ \omega Ld & R+Lqs & k\omega Ld & kLqs \\ kLds & -k\omega Lq & R+Lds & -\omega Lq \\ k\omega Ld & kLqs & \omega Ld & R+Lqs \end{bmatrix} \begin{bmatrix} id1 \\ iq1 \\ id2 \\ iq2 \end{bmatrix} + \begin{bmatrix} 0 \\ \omega Lfif \\ 0 \\ \omega Lfif \end{bmatrix} \quad (eq1)$$

In the first term on the right hand side of Eq. (1), R is an armature winding resistance, Ld is a d-axis inductance, Lq is a q-axis inductance, k is a coupling coefficient between the first and second winding sets, and s is a differential operator in the Laplace transform. In the second term on the right hand side of Eq. (1), Lf is an inductance of the field winding 11, if represents a field current. It should be noted that, in FIG. 2, an induced voltage and a voltage due to armature reaction as disturbance parameters are omitted.

Transfer functions of the motor 10 will now be explained.

A first d-axis interferer 40a adds an interfering voltage proportional to the electrical angular speed (rotation speed) ω of the motor 10 to the first d-axis command voltage vd1* outputted from the interference compensator 80. Such an interfering voltage is hereinafter referred to as a first d-axis rotation speed (or angular speed) interfering voltage. The first d-axis rotation speed interfering voltage is calculated by inputting the second q-axis current iq2 to a transfer function 40b, k×ω×Lq, i.e., a product of the coupling coefficient k, the electrical rotation speed ω and the q-axis inductance Lq.

A second d-axis interferer 40c subtracts an interfering voltage proportional to a derivative of the second d-axis current id2 from an output value of the first d-axis interferer 40a. Such an interfering voltage is hereinafter referred to as a first d-axis derivative interfering voltage. The first d-axis derivative interfering voltage is calculated by inputting the second d-axis current id2 into a transfer function 40d, k×Ld×s, i.e., a product of the coupling coefficient k, the d-axis inductance Ld and the differential operator s.

An output value of the second d-axis interferer 40c is inputted into a transfer function 40e for the d-axis of the motor 10, 1/(Ld×s+R). The first d-axis current id1 is then outputted from the transfer function 40e.

A third d-axis interferer 60a adds an interfering voltage proportional to the electrical angular speed ω of the motor 10 to the second d-axis command voltage Vd2* outputted from the interference compensator 80. Such an interfering voltage is hereinafter referred to as a second d-axis rotation speed (or angular speed) interfering voltage. The second d-axis rotation speed interfering voltage is calculated by inputting the first q-axis current iq1 to a transfer function 40b, k×ω×Lq, i.e., a product of the coupling coefficient k, the electrical angular speed ω and the q-axis inductance Lq.

A fourth d-axis interferer 60c subtracts an interfering voltage proportional to a derivative of the first d-axis current id1 from an output value of the third d-axis interferer 60a. Such an interfering voltage is hereinafter referred to as a second d-axis derivative interfering voltage. The second d-axis derivative interfering voltage is calculated by inputting the first d-axis current id1 into a transfer function 40d, k×Ld×s, i.e., a product of the coupling coefficient k, the d-axis inductance Ld and the differential operator s.

An output value of the fourth d-axis interferer 60c is inputted into a transfer function 60e for the d-axis of the motor 10, 1/(Ld×s+R). The second d-axis current id2 is then outputted from the transfer function 60e.

Similarly, as in the above process regarding the d-axis of the motor 10, a first q-axis interferer 50a adds an interfering voltage proportional to the electrical angular speed (rotation speed) ω of the motor 10 to the first q-axis command voltage vq1* outputted from the interference compensator 80. Such an interfering voltage is hereinafter referred to as a first q-axis rotation speed (or angular speed) interfering voltage. The first q-axis rotation speed interfering voltage is calculated by inputting the second d-axis current id2 to a transfer function 50b, k×ω×Ld, i.e., a product of the coupling coefficient k, the electrical angular speed ω and the d-axis inductance Ld. A second q-axis interferer 50c subtracts an interfering voltage proportional to a derivative of the second q-axis current iq2 from an output value of the first q-axis interferer 50a. Such an interfering voltage is hereinafter referred to as a first q-axis derivative interfering voltage. The first q-axis derivative interfering voltage is calculated by inputting the second q-axis current iq2 into a transfer function 50d, k×Lq×s, i.e., a product of the coupling coefficient k, the q-axis inductance Lq and the differential operator s. An output value of the second q-axis interferer 50c is inputted into a transfer function 50e for the q-axis of the motor 10, $1/(L_q \times s + R)$. The first q-axis current iq1 is then outputted from the transfer function 45e.

A third q-axis interferer 70a adds an interfering voltage proportional to the electrical angular speed ω of the motor 10 to the second q-axis command voltage Vq2* outputted from the interference compensator 80. Such an interfering voltage is hereinafter referred to as a second q-axis rotation speed (or angular speed) interfering voltage. The second q-axis rotation speed interfering voltage is calculated by inputting the first d-axis current id1 to a transfer function 70b, $k \times \omega \times L_d$, i.e., a product of the coupling coefficient k, the electrical angular speed ω and the d-axis inductance Ld. A fourth q-axis interferer 60c subtracts an interfering voltage proportional to a derivative of the first q-axis current iq1 from an output value of the third q-axis interferer 70a. Such an interfering voltage is hereinafter referred to as a second q-axis derivative interfering voltage. The second q-axis derivative interfering voltage is calculated by inputting the first q-axis current iq1 into a transfer function 70d, $k \times L_q \times s$, i.e., a product of the coupling coefficient k, the q-axis inductance Lq and the differential operator s. An output value of the fourth q-axis interferer 70c is inputted into a transfer function 70e for the d-axis of the motor 10, $1/(L_q \times s + R)$. The second q-axis current iq2 is then outputted from the transfer function 70e.

As described above, in the double-winding motor, the first and second d-axis rotation-speed interfering voltages, the first and second d-axis derivative interfering voltages, the first and second q-axis rotation-speed interfering voltages, and the first and second q-axis derivative interfering voltages are regarded as disturbance parameters in the current control system. Particularly, in the present embodiment, since the motor 10 is mounted in a vehicle, a rotation speed domain of use of the motor 10 is wide. Hence, increase of the rotation speed of the motor 10 or increase of the rotational acceleration (the rotation speed change rate) of the motor 10 may lead to undue degradation of responsiveness of the current control system due to the presence of the rotation-speed interfering voltages among the disturbance parameters.

To address these concerns, it may be envisaged that gains of the current controllers 40, 50, 60, 70 are enhanced. However, the degree to which the gains are enhanced is limited due to the presence of noise or the like that couples into the vehicle-mounted sensors, which may prevent avoiding degradation of responsiveness of the current control system.

Hence, in the present embodiment, to suppress the effect of the rotation-speed interfering voltages, interference compensation control is performed in the interference compensator 80.

More specifically, in the interference compensator 80, a first d-axis rotation speed voltage compensator 42a subtracts a first d-axis rotation speed interfering voltage from the first d-axis command voltage outputted from the first d-axis current controller 40. That is, the first d-axis command voltage calculated in the first d-axis current controller 40 for the first winding set 10a is compensated for a first d-axis rotation speed interfering voltage induced in the first winding set 10a. The first d-axis rotation speed interfering voltage fed to the first d-axis rotation speed voltage compensator 42a is calculated by inputting the second q-axis current iq2 (outputted from the second two-phase converter 34b) into a transfer function 42b, $k \times \omega \times L_q$, i.e., a product of the coupling coefficient k, the electrical angular speed ω and the q-axis inductance Lq.

A second d-axis rotation speed voltage compensator 62a subtracts a second d-axis rotation speed interfering voltage from the second d-axis command voltage outputted from the second d-axis current controller 60. That is, the second d-axis command voltage calculated in the second d-axis current controller 60 for the second winding set 10b is compensated for a second d-axis rotation speed interfering voltage induced in the second winding set 10b. The second d-axis rotation speed interfering voltage fed to the second d-axis rotation speed voltage compensator 62a is calculated by inputting the first q-axis current iq1 (outputted from the first two-phase converter 34a) into a transfer function 62b, $k \times \omega \times L_q$, i.e., a product of the coupling coefficient k, the electrical angular speed ω and the q-axis inductance Lq.

A first q-axis rotation speed voltage compensator 52a subtracts a first q-axis rotation speed interfering voltage from the first q-axis command voltage outputted from the first q-axis current controller 50. That is, the first q-axis command voltage calculated in the first q-axis current controller 50 for the first winding set 10a is compensated for a first q-axis rotation speed interfering voltage induced in the first winding set 10a. The first q-axis rotation speed interfering voltage fed to the first q-axis rotation speed voltage compensator 52a is calculated by inputting the second d-axis current id2 (outputted from the second two-phase converter 34b) into a transfer function 52b, $k \times \omega \times L_d$, i.e., a product of the coupling coefficient k, the electrical angular speed ω and the d-axis inductance Ld.

A second q-axis rotation speed voltage compensator 72a subtracts a second q-axis rotation speed interfering voltage from the second q-axis command voltage outputted from the second q-axis current controller 70. That is, the second q-axis command voltage calculated in the second q-axis current controller 70 for the second winding set 10b is compensated for a second q-axis rotation speed interfering voltage induced in the second winding set 10b. The second q-axis rotation speed interfering voltage fed to the second q-axis rotation speed voltage compensator 72a is calculated by inputting the first d-axis current id1 (outputted from the first two-phase converter 34a) into a transfer function 72b, $k \times \omega \times L_d$, i.e., a product of the coupling coefficient k, the electrical angular speed ω and the d-axis inductance Ld.

In the present embodiment, the transfer functions 42b, 52b, 62b, 72b form a first interfering voltage calculator configured to, for each of the winding sets, calculate interfering voltages proportional to the rotation speed of the motor 10, where the interfering voltages are caused by magnetic coupling between the first and second winding sets. In addition, the first d-axis rotation speed voltage compensator 42a, the second d-axis rotation speed voltage compensator 62a, the first q-axis rotation speed voltage compensator 52a, and the second q-axis rotation speed voltage compensator 72a form a voltage compensator.

Some benefits associated with the interference compensation control of the present embodiment will now be explained with reference to FIG. 3 through FIG. 8.

Figure 3:
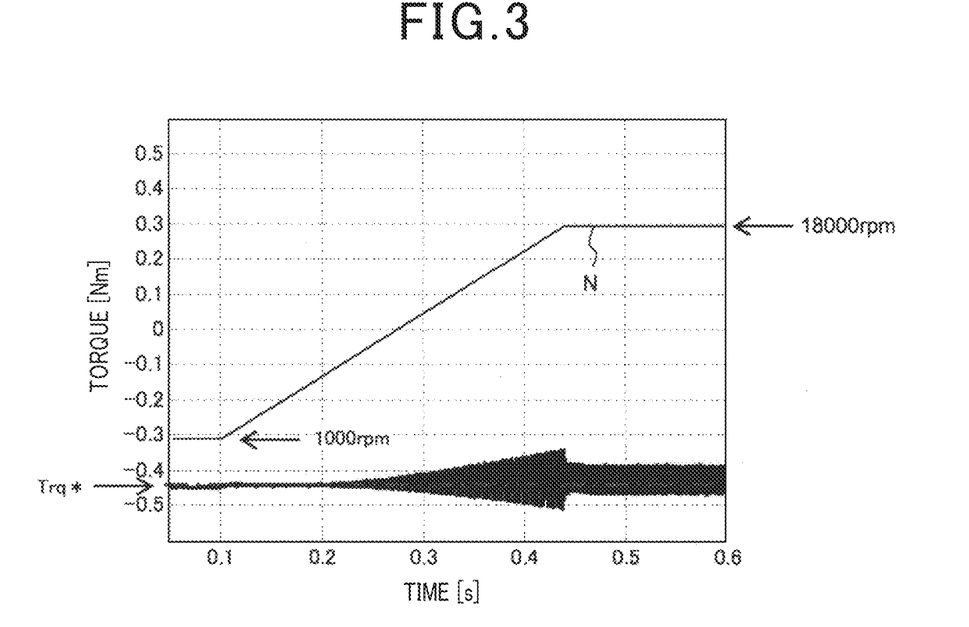
FIG. 3 shows the evolution of an output torque in accordance with the first embodiment.
Figure 4:
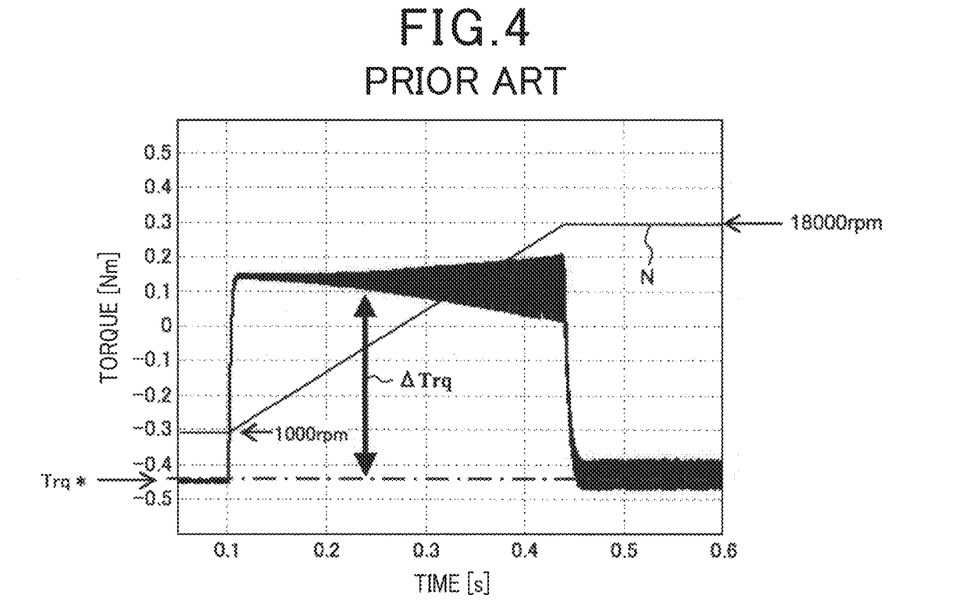
FIG. 4 shows the evolution of an output torque in accordance with the prior art.

FIG. 3 shows the evolution of an output torque of the motor 10 over a ramp-up period in which the rotation speed of the motor 10 is ramped up from 1,000 rpm to 18,000 rpm at the rotation speed change rate of 50,000 rpm/s with a command torque Trq* being kept constant, in accordance with the present embodiment where the interference compensation control set forth above is performed. FIG. 4 shows the evolution of an output torque of the motor 10 over the same ramp-up period at the same rotation speed change rate as in the example of FIG. 3, in accordance with the prior art disclosed in Japanese Patent Application Laid-Open Publication No. 2003-153585.

As shown in FIG. 3, in the present embodiment where the interference compensation control is conducted, a torque error that is a deviation of the output torque from the command torque Trq* can be reduced. In contrast, in the prior art, the command voltages are not compensated for their respectively corresponding interfering voltages (the first and second d-axis rotation speed interfering voltages and the first and second q-axis rotation speed interfering voltages). Accordingly, the torque error ΔTrq is increased over the period in which the rotation speed of the motor 10 is ramped up.

Figure 5:
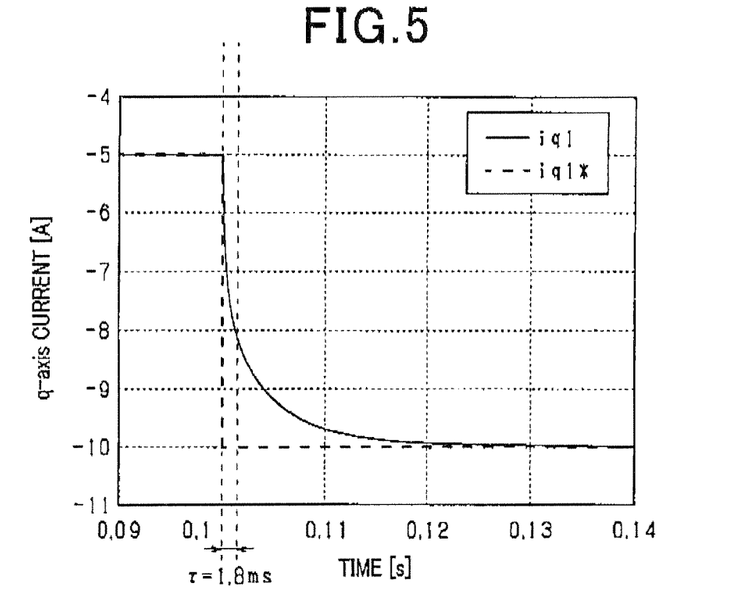
FIG. 5 shows the evolution of q-axis current in accordance with the first embodiment.
Figure 6:
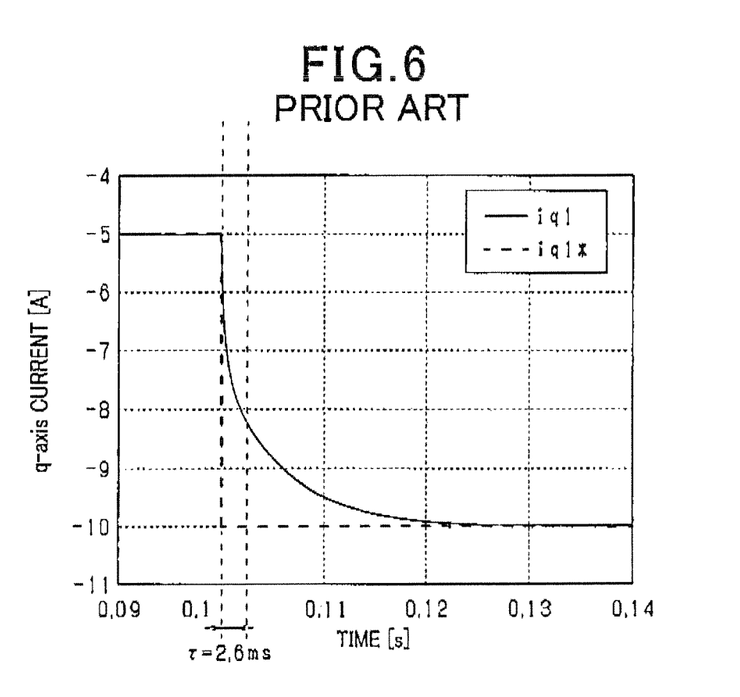
FIG. 6 shows the evolution of q-axis current in accordance with the prior art.

Subsequently, the effect of improving the responsiveness of the current control system via the interference compensation control will be explained with reference to FIG. 5 and FIG. 6. FIG. 5 shows the evolutions of the first q-axis current iq1 and the first q-axis command current iq1*, where the interference compensation control is performed. FIG. 6 shows the evolutions of the first q-axis current iq1 and the first q-axis command current iq1* in accordance with the prior art.

As can be seen from FIG. 5 and FIG. 6, the interference compensation control can lead to reduction of a time constant as compared to the prior art. That is, the responsiveness of the current control system can preferably be improved.

Figure 7:
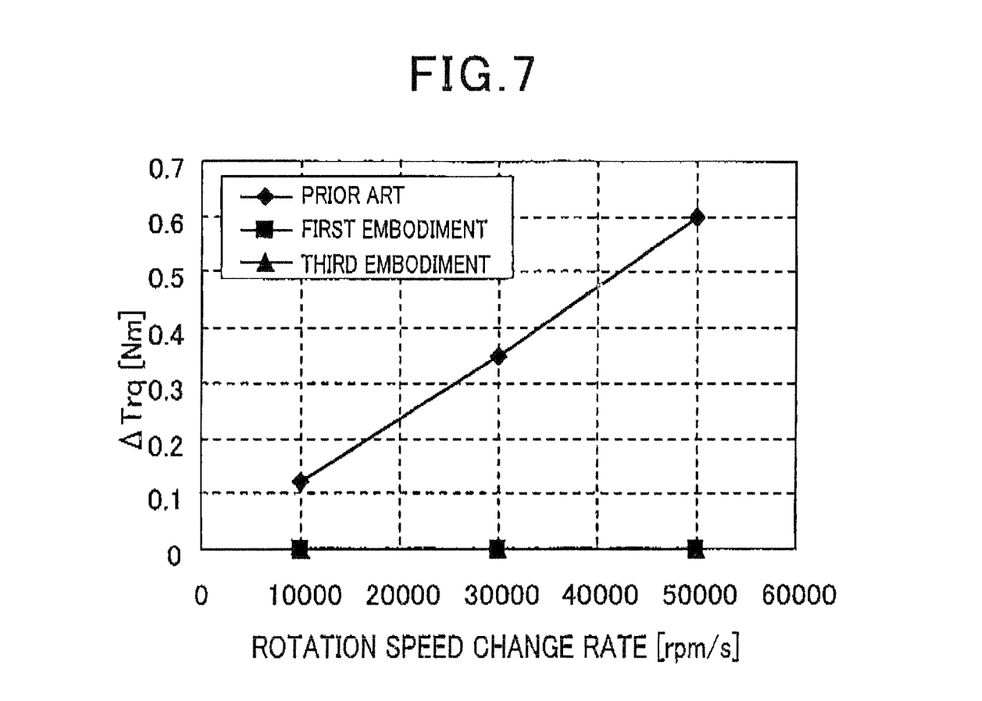
FIG. 7 shows torque errors ΔTrq at various rotation speed change rates.

Subsequently, FIG. 7 shows torque errors ΔTrq at various rotation speed change rates. As shown in FIG. 7, the interference compensation control of the present embodiment can lead to significant reduction of the torque error ΔTrq as compared to the prior art.

Figure 8:
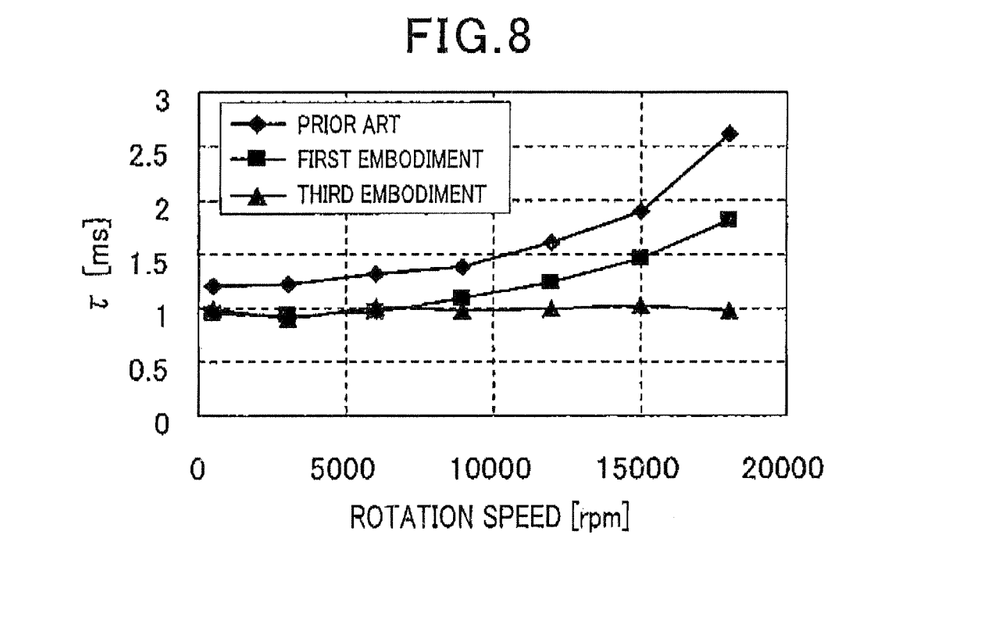
FIG. 8 shows time constants τ at various rotation speeds.

FIG. 8 shows time constants τ at various rotation speeds of the motor 10. As shown in FIG. 8, the interference compensation control of the present embodiment can lead to significant reduction of the time constant τ at various rotation speeds as compared to the prior art. Particularly, at the rotation speed of 18,000 rpm, the responsiveness of the current control system can preferably be improved by 31% as compared to the prior art.

There are some benefits associated with the present embodiment set forth above.

(1) The command voltages Vd1*, Vd2*, Vq1*, Vq2* are compensated for their respectively corresponding rotation speed interfering voltages in the interference compensator 80. Hence, even in the presence of high rotation speed and/or rotation speed change rate of the motor 10, the responsiveness of the current control system can preferably be improved. This leads to preferable reduction of the torque error of the motor 10.

(2) The rotation speed interfering voltages for the second winding set 10b of the motor 10 are calculated by inputting coordinate transformed detection values of the first current sensors 26a, 26b into the transfer functions 62b, 72b. The rotation speed interfering voltages for the first winding set 10a of the motor 10 are calculated by inputting coordinate transformed detection values of the second current sensor 28a, 28b into the transfer functions 42b, 52b. Such a configuration can reduce the computational load on the controller 30.

(3) The interference compensation control is applied to the vehicle control system including the first battery 18a supplied with electrical power produced by the motor 10, and the electrical power steering device 20a powered by both the first battery 18a and the motor 10. Since the motor 10 mounted in the vehicle rotates in conjunction with the crankshaft 16a during traveling of the vehicle, a rotation speed domain in use becomes wider and the torque error is more likely to occur. For example, when the battery 18a becomes unable to be used as a buffer due to the presence of abnormality in the battery 18a, the electrical power steering device 20a will be electrically powered by the motor 10 only. A significant torque error of the motor 10 will lead to a large deviation of the electrical power produced by the motor 10 from the demand electrical power of the electrical power steering device 20a, which may cause unstable operation of the electrical power steering device 20a. Hence, in the present embodiment, the interference compensation control is advantageously performed to reduce the torque error and thereby reduce the deviation of the electrical power produced by the motor 10 from the demand electrical power of the electrical power steering device 20a.

(4) The first inverter INV1 and the second inverter INV2 are electrically connected to their respectively corresponding batteries 18a, 18b. With such a configuration, when demand voltages of a plurality of vehicle-mounted devices are different from each other and each of the devices is powered by the first battery 18a or the second battery 18b, the first battery 18a and the second battery 18b can properly be charged with electrical power produced by the motor 10.

(5) A lead battery is used as the second battery 18b. Unless the interference compensation control is performed when the rotation speed of the motor 10 abruptly changes, e.g., upon occurrence of so called the slip and grip phenomenon (which occurs when wheels grip a roadway surface after wheelspin), the torque error will increase. Since the lead battery can only receive lower power per time unit, the lead battery may not be able to fully receive electrical power produced by the motor 10 in the presence of significant torque error. The operation of the electrical load 20b to which produced power is supplied will then adversely be affected. Therefore, in the present embodiment where the lead battery is used, application of the interference compensation control may be advantageous.

(Second Embodiment)

There will now be explained a second embodiment of the present invention. Only differences of the second embodiment from the first embodiment will be explained.

Figure 9:
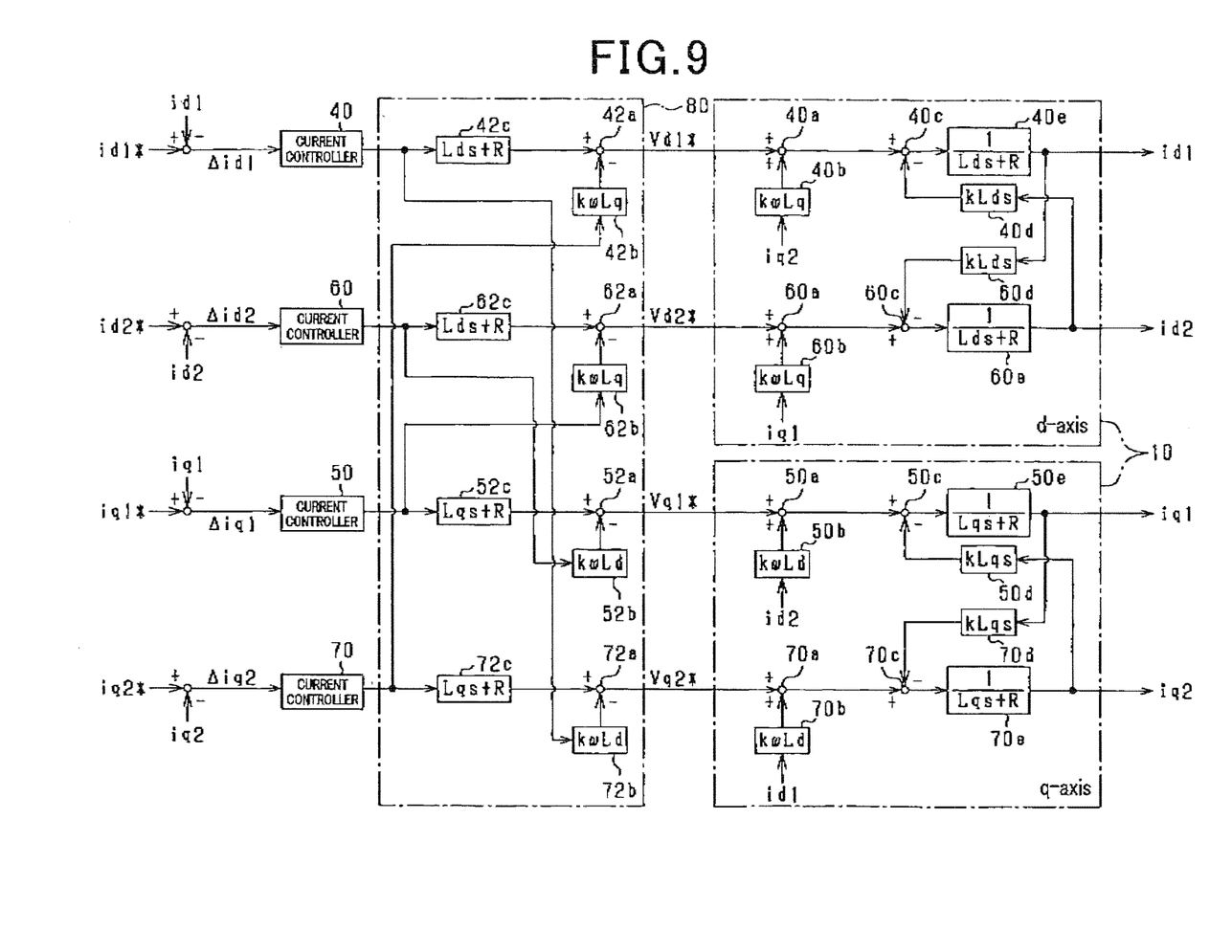
FIG. 9 shows a schematic block diagram of a current control system in accordance with a second embodiment of the present invention.

In the present embodiment, the interference compensator 80 is modified in configuration as follows.

FIG. 9 shows a schematic block diagram of a current control system for the motor 10 of the present embodiment. Elements having similar functions as in the first embodiment are assigned the same numbers.

In the present embodiment, the first d-axis current controller 40 calculates a current value as a manipulated variable to feedback control the first d-axis current id1 to the first d-axis command current id1*. The first d-axis command voltage is calculated by inputting the current value calculated in first d-axis current controller 40 into a transfer function 42c that represents the impedance for the d-axis of the motor 10. Similarly, the second d-axis current controller 60 calculates a current value as a manipulated variable to feedback control the second d-axis current id2 to the second d-axis command current id2*. The second d-axis command voltage is calculated by inputting the current value calculated in the second d-axis current controller 60 into a transfer function 62c that represents the impedance for the d-axis of the motor 10. The first q-axis current controller 50 calculates a current value as a manipulated variable to feedback control the first q-axis current iq1 to the first q-axis command current iq1*. The first q-axis command voltage is calculated by Inputting the current value calculated in first q-axis current controller 50 into a transfer function 52c that represents the impedance for the q-axis of the motor 10. The second q-axis current controller 70 calculates a current value as a manipulated variable to feedback control the second q-axis current iq2 to the second q-axis command current iq2*. The second q-axis command voltage is calculated by inputting the current value calculated in the second q-axis current controller 70 into a transfer function 72c that represents the impedance for the q-axis of the motor 10.

The first d-axis current controller 40, the first q-axis current controller 50, the second d-axis current controller 60, and the second q-axis current controller 70 form a current manipulated variable calculator. A pair of the first d-axis current controller 40 and the transfer function 42c, a pair of the second d-axis current controller 60 and the transfer function 62c, a pair of the first q-axis current controller 50 and the transfer function 52c, and a pair of the second q-axis current controller 70 and the transfer function 72c each function as a command voltage calculator.

There will now be explained the interference compensation control of the present embodiment.

In the present embodiment, a first d-axis rotation speed interfering voltage is calculated by inputting the current value outputted from the second q-axis current controller 70 into a transfer function 42b, k×ω×Lq, i.e., a product of the coupling coefficient k, the electrical angular speed ω and the q-axis inductance Lq, and a second d-axis rotation speed interfering voltage is calculated by inputting the current value outputted from the first q-axis current controller 50 into a transfer function 62b, k×ω×Lq. A first q-axis rotation speed interfering voltage is calculated by inputting the current value outputted from the second d-axis current controller 60 into a transfer function 52b, k×ω×Ld, i.e., a product of the coupling coefficient k, the electrical angular speed ω and the d-axis inductance Lq, and a second q-axis rotation speed interfering voltage is calculated by inputting the current value outputted from the first d-axis current controller 40 into a transfer function 72b, k×ω×Ld.

Figure 10:
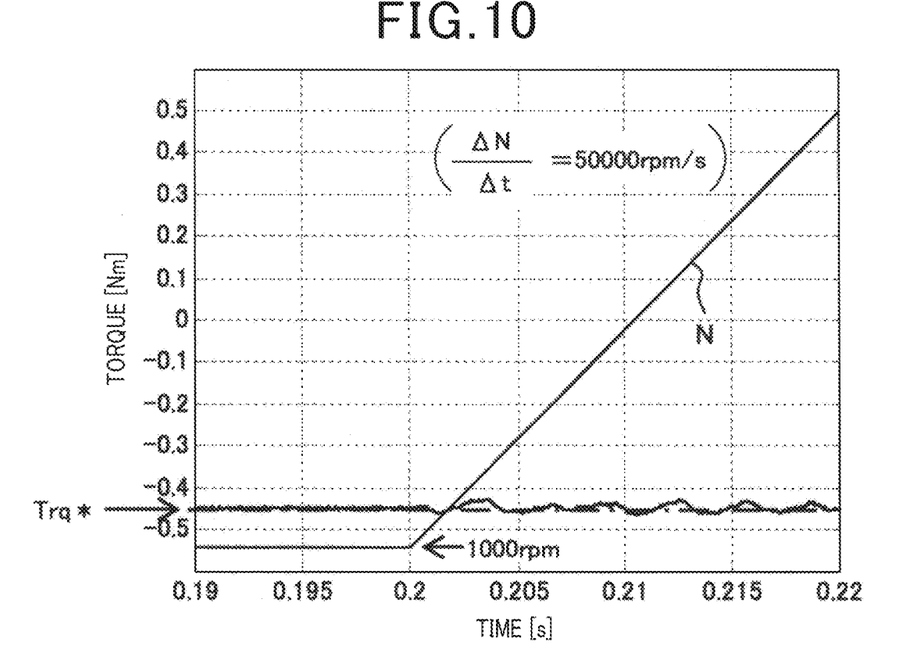
FIG. 10 shows the evolution of an output torque in accordance with the second embodiment.
Figure 11:
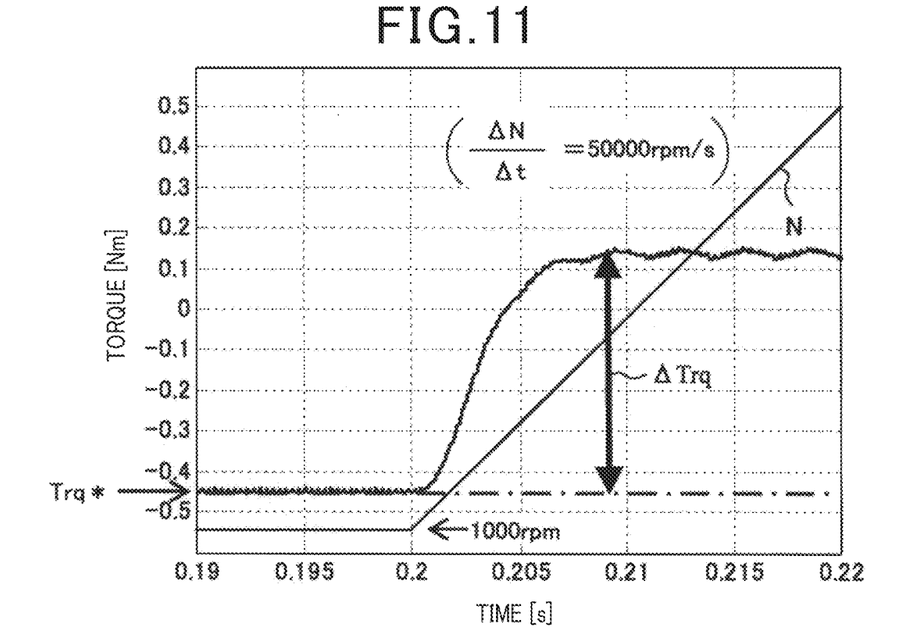
FIG. 11 shows the evolution of an output torque in accordance with the prior art.

Some benefits associated with the interference compensation control of the present embodiment will now be explained with reference to FIG. 10 and FIG. 11. FIG. 10, as with FIG. 3, shows the evolution of an output torque of the motor 10 over a ramp-up period in which the rotation speed of the motor 10 is ramped up from 1,000 rpm at the rotation speed change rate of 50,000 rpm/s with a command torque Trq* being kept constant, in accordance with the present embodiment where the interference compensation control set forth above is performed. FIG. 11, as with FIG. 4, shows the evolution of an output torque of the motor 10 over the same ramp-up period at the same rotation speed change rate as in the example of FIG. 10, in accordance with the prior art disclosed in Japanese Patent Application Laid-Open Publication No. 2003-153585.

As can been seen from FIG. 10, the interference compensation control of the present embodiment can lead to reduction of the torque error ΔTrq as compared to the prior art.

The present embodiment can thus provide similar benefits as in the first embodiment.

(Third Embodiment)

There will now be explained a second embodiment of the present invention. Only differences of the third embodiment from the second embodiment will be explained.

Figure 12:
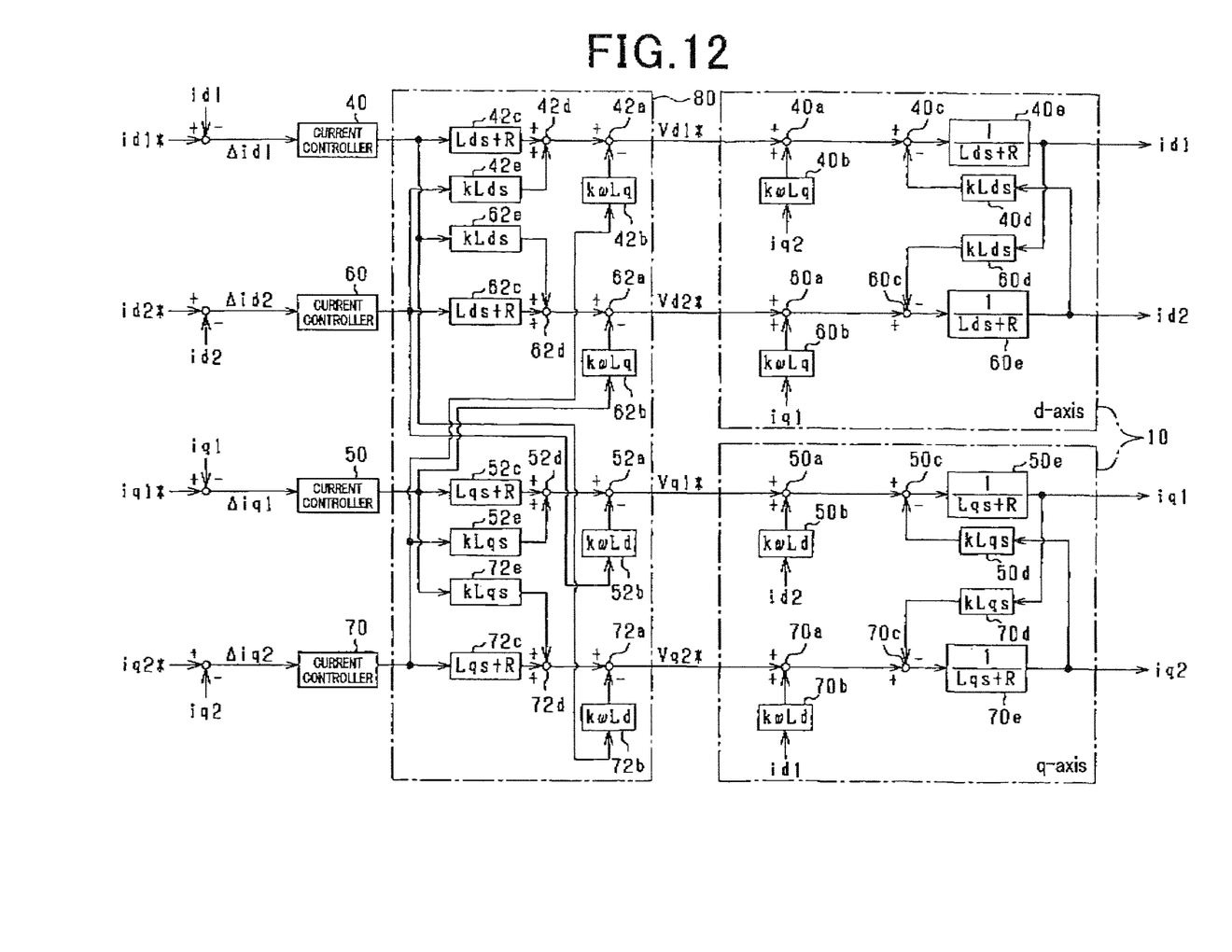
FIG. 12 shows a schematic block diagram of a current control system in accordance with a third embodiment of the present invention.

In the present embodiment, the interference compensator 80 is further modified in configuration as follows.

FIG. 12 shows a schematic block diagram of a current control system for the motor 10 of the present embodiment. Elements having similar functions as in the second embodiment (see FIG. 9) are assigned the same numbers.

In the present embodiment, the command voltages Vd1*, Vq1*, Vd2*, Vq2* are compensated not only for their respectively corresponding rotation speed interfering voltages, but also for their respectively corresponding derivative interfering voltages.

More specifically, a first d-axis derivative voltage compensator 42d sums a first d-axis derivative interfering voltage and a first d-axis command voltage outputted from the transfer function 42c to feed the summed value to the first d-axis rotation speed voltage compensator 42a. The first d-axis derivative interfering voltage to be fed to the first d-axis derivative voltage compensator 42d is calculated by inputting the output value of the second d-axis current controller 60 into a transfer function 42e, k×Ld×s, i.e., a product of the coupling coefficient k, the d-axis inductance Ld and the differential operator s.

A second d-axis derivative voltage compensator 62d sums a second d-axis derivative interfering voltage and a second d-axis command voltage outputted from the transfer function 62c to feed the summed value to the second d-axis rotation speed voltage compensator 62a. The second d-axis derivative interfering voltage to be fed to the second d-axis derivative voltage compensator 62d is calculated by inputting the output value of the first d-axis current controller 40 into a transfer function 62e, k×Ld×s.

A first q-axis derivative voltage compensator 52d sums a first q-axis derivative interfering voltage and a first q-axis command voltage outputted from the transfer function 52c to feed the summed value to the first q-axis rotation speed voltage compensator 52a. The first q-axis derivative interfering voltage is calculated by inputting the output value of the second q-axis current controller 70 into a transfer function 52e, k×Lq×s, i.e., a product of the coupling coefficient k, the q-axis inductance Lq and the differential operator s.

A second q-axis derivative voltage compensator 72d sums a second q-axis derivative interfering voltage and a second q-axis command voltage outputted from the transfer function 72c to feed the summed value to the second q-axis rotation speed voltage compensator 72a. The second q-axis derivative interfering voltage is calculated by inputting the output value of the first q-axis current controller 50 into a transfer function 72e, k×Lq×s.

In the present embodiment, the transfer functions 42e, 52e, 62e, 72e form a second interfering voltage calculator configured to calculate interfering voltages proportional to derivatives of currents outputted from the current controllers by multiplying the derivatives of the currents by their respectively corresponding coefficients k×Ld, k×Lq.

Figure 13:
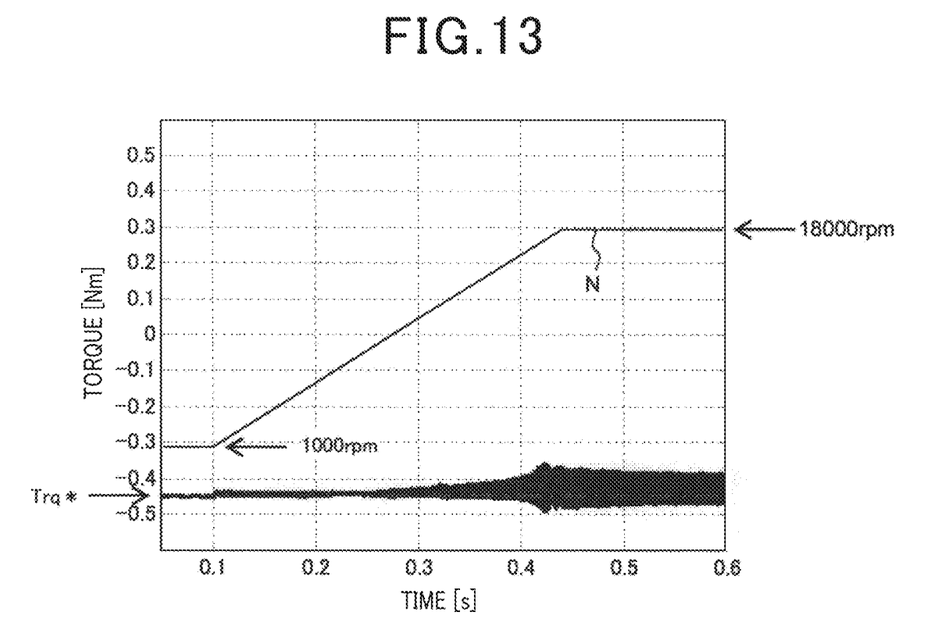
FIG. 13 shows the evolution of an output torque in accordance with the third embodiment.
Figure 14:
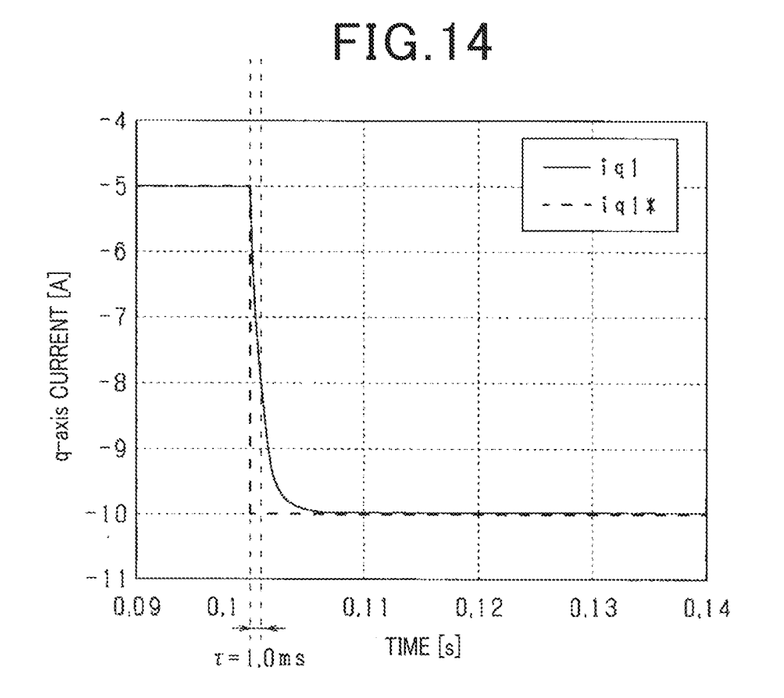
FIG. 14 shows the evolution of a q-axis current in accordance with the third embodiment.

Some benefits associated with the interference compensation control of the present embodiment will now be explained with reference to FIG. 13, FIG. 14, FIG. 7, and FIG. 8. FIG. 13 and FIG. 14 correspond to FIG. 3 and FIG. 5, respectively.

As can been seen from FIG. 13, the interference compensation control of the present embodiment can lead to reduction of the torque error ΔTrq. In addition, as can be seen from FIG. 14, the responsiveness of the current control system can preferably be improved.

In addition, as can be seen from FIG. 7, the interference compensation control of the present embodiment can also lead to significant reduction of the torque error ΔTrq as compared to the prior art. As can be seen from FIG. 8, the interference compensation control of the present embodiment can also lead to significant reduction of the time constant τ at various rotation speeds as compared to the prior art. Particularly, at the rotation speed of 18,000 rpm, the responsiveness of the current control system can preferably be improved by 62% as compared to the prior art.

Besides the benefits of the second embodiment, the third embodiment can further improve the responsiveness of the current control system.

(Other Embodiments)

The present invention is described above referring to some specific embodiments. However, the present invention is not limited to the specific embodiments. The configuration and detailed parts of the present invention can be variously modified within a scope of the present invention to be understood by those skilled in the art.

In each of the first to third embodiments, the wound-field synchronous electrical motor configured as shown in FIG. 1 is used. In some alternative embodiments, another type of wound-field synchronous electrical motor configured such the field winding is excited by the current flowing through stator windings may be used. In some alternative embodiments, another type of synchronous electrical motor, for example, a permanent magnet field synchronous electrical motor or a synchronous reluctance motor, may be used instead of the wound-field synchronous electrical motor.

In each of the first to third embodiments, the multi-winding rotary machine is a double-winding rotary machine. In some alternative embodiments, the multi-winding rotary machine may be an N-fold-winding rotary machine where N is an integer greater than two. The present invention is also applicable to such alternative embodiments when interfering voltages proportional to the rotation speed of the rotary machine are caused by magnetic coupling between the N winding sets. For example, for N=3, the command voltages for each of the three winding sets can be compensated for their respectively corresponding interfering voltages proportional to the rotation speed of the rotary machine that are caused by magnetic coupling between the three winding sets.

In each of the first to third embodiments, the command voltages are compensated for their respectively corresponding rotation speed interfering voltages in the rotating coordinate system (dq-axis coordinate system). Alternatively, the command voltages are compensated for their respectively corresponding rotation speed interfering voltages in the stationary coordinate system. For example, the rotation speed interfering voltages calculated in the rotating coordinate system are transformed into the stationary coordinate system. The command voltages in the stationary coordinate system are compensated for their respectively corresponding rotation speed interfering voltages transformed into the stationary coordinate system.

The first embodiment may be modified so as to include the second interfering voltage calculator as described in the third embodiment. More specifically, for example, the first d-axis command voltage Vd1* may be compensated not only for the first d-axis rotation speed interfering voltage, but also for the first d-axis derivative interfering voltage by multiplying the derivative of the second d-axis current id2 by the d-axis inductance Ld and the coupling coefficient k.

In each of the first to third embodiments, as shown in FIG. 1, the first and second batteries (as secondary batteries) 18a, 18b, the electrical power steering device 20a and the electrical load 20b (as vehicle-mounted devices) are electrically connected to their respective inverters INV1, INV2. That is, the first battery 18a and the electrical power steering device 20a are electrically connected to the inverter INV1, and the second battery 18b and the electrical load 20b are electrically connected to the inverter INV2, where the demand voltage of the electrical power steering device 20a is set higher than the demand voltage of the electrical load 20b. Alternatively, for example, the inverters INV1, INV2 may electrically be connected to common secondary batteries and common vehicle-mounted devices. More specifically, for example, when the demand voltages of the majority of vehicle-mounted devices are high, the second battery 18b and the electrical load 20b may be removed, and the second inverter INV2 may also be connected to the first battery 18a and the electrical power steering device 20a. Advantageously, in such an alternative embodiment, the turn number N1 of each of the windings forming the first winding set 10a and the turn number N2 of each of the windings forming the second winding set 10b may be set equal to each other.

In each of the first to third embodiments, the switching elements of the inverters INV1, INV2 are N-channel MOSFETs. Alternatively, the switching elements of the inverters INV1, INV2 may be, for example, insulated gate bipolar transistors (IGBT).

Many modifications and other embodiments of the invention will come to mind to one skilled in the art to which this invention pertains having the effect of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An apparatus for controlling a multi-winding rotary machine having an armature formed of a plurality of winding sets, each winding set including multi-phase windings electrically connected to a respective neutral point, the apparatus being incorporated in a rotary machine control system having a current detector configured to, for each of the winding sets, detect multi-phase currents flowing through the winding set, and a voltage applicator configured to, for each of the winding sets, apply multi-phase voltages to the winding set, the apparatus comprising:
   a command voltage calculator configured to, for each of the winding sets, calculate command voltages to be applied to the winding set so as to control the currents detected by the current detector to their respectively corresponding command currents;
   an interfering voltage calculator configured to, for each of the winding sets, calculate interfering voltages proportional to a rotation speed of the rotary machine, the interfering voltages being caused by magnetic coupling between the winding set and at least one of the other winding sets;
   an interfering voltage compensator configured to, for each of the winding sets, compensate the command voltages calculated by the command voltage calculator for their respectively corresponding interfering voltages calculated by the interfering voltage calculator; and
   an operation unit configured to, for each of the winding sets, operate the voltage applicator to apply output values of the interfering voltage compensator to the winding set.

2. An apparatus for controlling a multi-winding rotary machine having an armature formed of a plurality of a winding sets, the apparatus being incorporated in a rotary machine control system having a current detector configured to, for each of the winding sets, detect currents flowing through the winding set, and a voltage applicator configured to, for each of the winding sets, apply voltages to the winding set the apparatus comprising:
   a command voltage calculator configured to, for each of the winding sets, calculate command voltages to be applied to the winding set so as to control the currents detected by the current detector to their respectively corresponding command currents;
   an interfering voltage calculator configured to, for each of the winding sets, calculate interfering voltages proportional to a rotation speed of the rotary machine, the interfering voltages being caused by magnetic coupling between the winding set and at least one of the other winding sets;
   an interfering voltage compensator configured to, for each of the winding sets, compensate the command voltages calculated by the command voltage calculator for their respectively corresponding interfering voltages calculated by the interfering voltage calculator; and an operation unit configured to, for each of the winding sets, operate the voltage applicator to apply output values of the interfering voltage compensator to the winding set, wherein the command voltage calculator comprises a current manipulated variable calculator configured to, for each of the winding sets, calculate current values as manipulated variables to feedback control the currents detected by the current detector to the command currents, and calculates the command voltages by multiplying the current values calculated by the current manipulated variable calculator by an impedance of the rotary machine, and the interfering voltage calculator calculates interfering voltages proportional to the rotation speed of the rotary machine by multiplying the current values calculated by the current manipulated variable calculator by their respectively corresponding coefficients proportional to the rotation speed of the rotary machine.

3. The apparatus of claim 1, wherein the interfering voltage calculator calculates interfering voltages proportional to the rotation speed of the rotary machine by multiplying current values detected by the current detector by their respectively corresponding coefficients proportional to the rotation speed of the rotary machine.

4. An apparatus for controlling a multi-winding rotary machine having an armature formed of a plurality of winding sets, the apparatus being incorporated in a rotary machine control system having a current detector configured to, for each of the winding sets, detect currents flowing through the winding set, and a voltage applicator configured to, for each of the winding sets, apply voltages to the winding set, the apparatus comprising:

a command voltage calculator configured to, for each of the winding sets, calculate command voltages to be applied to the winding set so as to control the currents detected by the current detector to their respective corresponding command currents;

an interfering voltage calculator configured to, for each of the winding sets, calculate interfering voltages proportional to a rotation speed of the rotary machine, the interfering voltages being caused by a magnetic coupling between the winding set and at least one of the other winding sets;

an interfering voltage compensator configured to, for each of the winding sets, compensate the command voltages calculated by the command voltage calculator for their respectively corresponding interfering voltages calculated by the interfering voltage calculator; and an operation unit configured to, for each of the winding sets, operate the voltage applicator to apply output values of the interfering voltage compensator to the winding set, wherein the interfering voltage calculator is a first interfering voltage calculator, and the apparatus further comprises a second interfering voltage calculator configured to, for each of the winding sets, calculate interfering voltages proportional to derivatives of their respectively corresponding currents flowing through at least one of the other windings, the interfering voltages being caused by magnetic coupling between the winding set and at least one of the other winding sets, and the interfering voltage compensator is configured to, for each of the winding sets, compensate the command voltages calculated by the command voltage calculator for their respectively corresponding interfering voltages calculated by the first interfering voltage calculator and their respectively corresponding interfering voltages calculated by the second interfering voltage calculator.

5. The apparatus of claim 4, wherein the command voltage calculator comprises a current manipulated variable calculator configured to, for each of the winding sets, calculate current values as manipulated variables to feedback control the currents detected by the current detector to the command currents, and calculate the command voltages by multiplying the current values calculated by the current manipulated variable calculator by an impedance of the rotary machine, and the second interfering voltage calculator calculates interfering voltages proportional to the derivatives of their respectively corresponding currents by multiplying the derivatives of their respectively corresponding currents by their respectively corresponding coefficients.

6. The apparatus of claim 1, wherein the system is mounted in a vehicle including an engine as a prime mover, the rotary machine is configured such that power transmission is enabled between a rotor and a crankshaft of the engine, and functions as an alternator, the vehicle includes a secondary battery supplied with electrical power produced by the rotary machine via an inverter as the voltage applicator, and a vehicle mounted device that can be powered by the rotary machine and the secondary battery.

7. The apparatus of claim 6, wherein the vehicle includes a plurality of secondary batteries having respectively different terminal voltages and supplied with electrical power produced by the rotary machine via their respectively corresponding inverters forming the voltage applicator, and a plurality of vehicle mounted devices that can be powered by the rotary machine and their respectively corresponding secondary batteries.

* * * * *